United States Patent
Shimatani

(10) Patent No.: US 11,765,297 B2
(45) Date of Patent: Sep. 19, 2023

(54) IMAGE SCANNING APPARATUS

(71) Applicant: KYOCERA Document Solutions Inc., Osaka (JP)

(72) Inventor: Akira Shimatani, Osaka (JP)

(73) Assignee: Kyocera Document Solutions, Inc.

( * ) Notice: Subject to any disclaimer, the term of this patent is extended or adjusted under 35 U.S.C. 154(b) by 0 days.

(21) Appl. No.: 17/819,715

(22) Filed: Aug. 15, 2022

(65) Prior Publication Data

US 2023/0063596 A1    Mar. 2, 2023

(30) Foreign Application Priority Data

Aug. 24, 2021 (JP) .................................. 2021-136255

(51) Int. Cl.
| | |
|---|---|
| H05B 45/325 | (2020.01) |
| H04N 1/60 | (2006.01) |
| H04N 1/028 | (2006.01) |
| H05B 45/20 | (2020.01) |

(52) U.S. Cl.
CPC ......... H04N 1/02815 (2013.01); H05B 45/20 (2020.01); H05B 45/325 (2020.01)

(58) Field of Classification Search
CPC ...... H05B 45/20; H05B 45/30; H05B 45/325; H05B 45/44; H04N 1/02815; H04N 9/3123; H04N 1/60; H04N 1/6002; H04N 1/482; H04N 1/00933; H04N 25/745; G09G 3/20; G09G 3/2014; G09G 3/22; G09G 3/285
See application file for complete search history.

(56) References Cited

U.S. PATENT DOCUMENTS

| | | | |
|---|---|---|---|
| 8,363,294 B2 * | 1/2013 | Kim ........................ | H04N 1/484 358/487 |
| 2011/0149306 A1 * | 6/2011 | Kim ........................ | H04N 1/193 358/475 |
| 2014/0176656 A1 * | 6/2014 | Omori ..................... | H05B 47/16 315/250 |
| 2015/0116435 A1 * | 4/2015 | Kawamoto ............... | H01S 5/06 359/204.4 |
| 2022/0028310 A1 * | 1/2022 | Kim ........................ | H05B 45/10 |

FOREIGN PATENT DOCUMENTS

| | | |
|---|---|---|
| JP | 2013-030971 | 2/2013 |
| JP | 2014-216934 | 11/2014 |

* cited by examiner

*Primary Examiner* — Thai Pham

(57) ABSTRACT

An image scanning apparatus includes plural light sources, an image sensor, a driving circuit, and a controller. The plural light sources are configured to emit light of plural colors. The image sensor is configured to scan an image on the basis of the light sequentially emitted by the plural light sources. The driving circuit is configured to drive the plural light sources. The controller is configured to supply to the driving circuit an instruction of light-emitting pulse widths of the light sources. Further, the controller corrects the light-emitting pulse widths in monochrome scanning on the basis of a rising time and a falling time of driving currents conducted through the light sources by the driving circuit so as to cause the light-emitting pulse widths to agree with light-emitting pulse widths based on predetermined color balance ratios of the plural colors, respectively.

3 Claims, 3 Drawing Sheets

IMAGE SCANNING APPARATUS

CROSS-REFERENCE TO RELATED APPLICATIONS

This application relates to and claims priority rights from Japanese Patent Application No. 2021-136255, filed on Aug. 24, 2021, the entire disclosures of which are hereby incorporated by reference herein.

BACKGROUND

1. Field of the Present Disclosure

The present disclosure relates to an image scanning apparatus.

2. Description of the Related Art

An image processing apparatus detects a peak value and a peak position of scanned values of a white reference board when a light source is on, and adjusts a light amount of the light source so as to cause the peak value to agree with a desired value, and sets a light amount amplification factor on the basis of the peak value and a scanned value at the peak position obtained when the light source is off.

Another image scanning apparatus turns on plural light sources of plural primary colors in turn, sequentially reads light of the light sources, and adjusts a width limit value of pulse width modulation for each of the light sources on the basis of a difference between a reference data value obtained on the basis of light when the light source is off and a reference data value obtained on the basis of light when the light source is on.

If a monochrome scanning is performed using an image sensor module of a light-source switching type (e.g. CIS (Contact Image Sensor) module or the like), a controller causes each of light sources of RGB (Red, Green, Blue) to emit light using a driving circuit with a light amount in accordance with a predetermined color balance ratios (e.g. Red light amount:Green light amount:Blue light amount=3:6:1). For example, the light sources of RGB are caused to emit light of constant light amount levels with pulse widths corresponding to the color balance ratios, and thereby the light is emitted from each of the light sources with desired light amounts.

However, due to response characteristics of the driving circuit and the light sources (e.g. LEDs (Light Emitting Diodes) or the like), even though the controller supplies to the driving circuit an instruction of the pulse widths according to the color balance ratios, the actual pulse widths of light emitted from the light sources may not be in accordance with the color balance ratios. In particular, if a color has a low color balance ratio in monochrome scanning, light of this color may not be emitted.

SUMMARY

An image scanning apparatus according to an aspect of the present disclosure includes plural light sources, an image sensor, a driving circuit, and a controller. The plural light sources are configured to emit light of plural colors. The image sensor is configured to scan an image on the basis of the light sequentially emitted by the plural light sources. The driving circuit is configured to drive the plural light sources. The controller is configured to supply to the driving circuit an instruction of light-emitting pulse widths of the light sources. Further, the controller corrects the light-emitting pulse widths in monochrome scanning on the basis of a rising time and a falling time of driving currents conducted through the light sources by the driving circuit so as to cause the light-emitting pulse widths to agree with light-emitting pulse widths based on predetermined color balance ratios of the plural colors, respectively.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Figure 1:
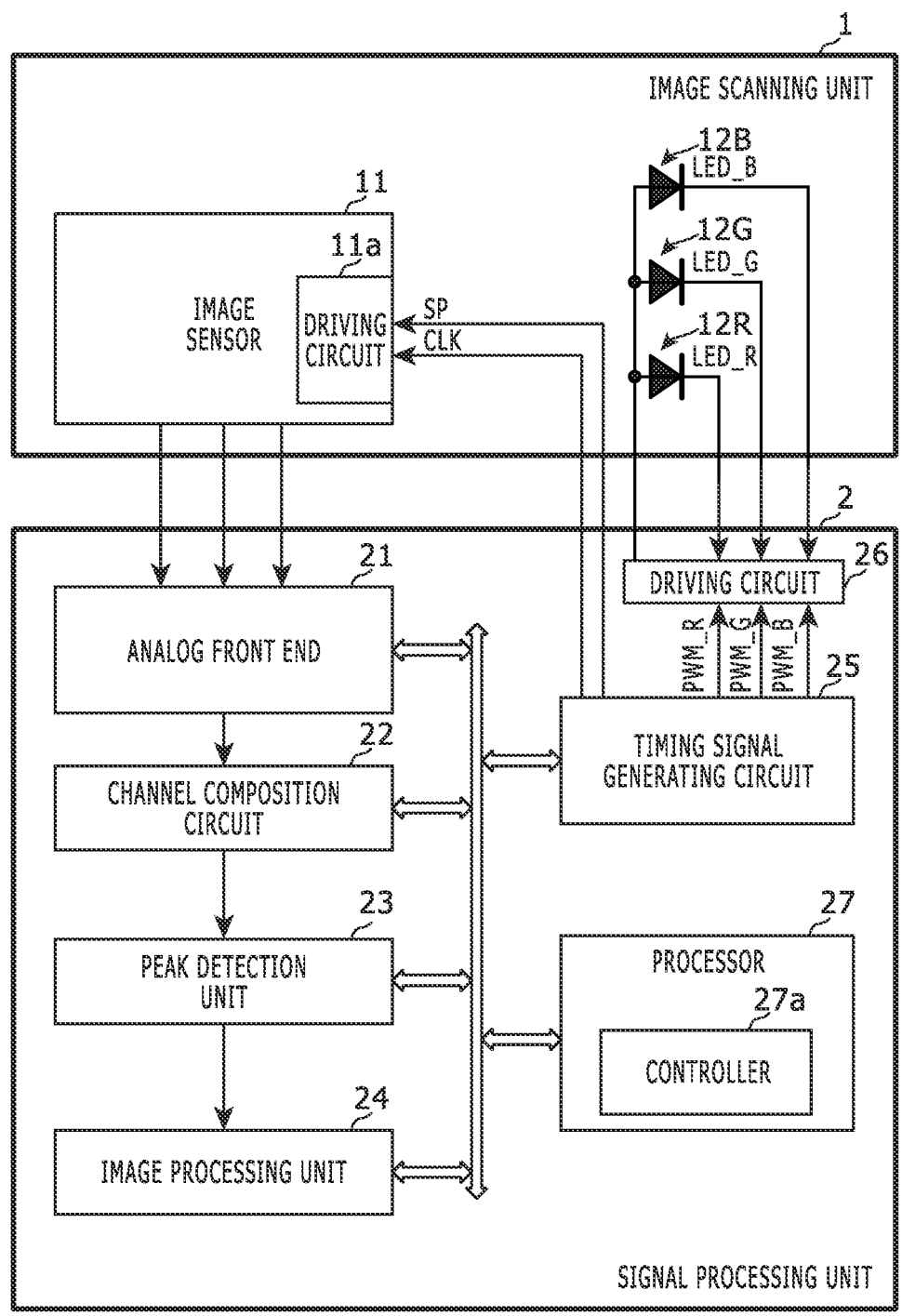
FIG. 1 shows a block diagram that indicates a configuration of an image processing apparatus according to an embodiment of the present disclosure.

FIG. 1 shows a block diagram that indicates a configuration of an image processing apparatus according to an embodiment of the present disclosure. In this embodiment, the image processing apparatus shown in FIG. 1 is an image scanning apparatus such as scanner or multi function peripheral, and includes an image scanning unit 1 and a signal processing unit 2.

The image scanning unit 1 includes an image sensor 11 and light sources 12R, 12G, and 12B. The image sensor 11 is a CIS sensor, for example, and is driven by a driving circuit 11a in accordance with driving signals such as start pulse signal SP and clock CLK, and optically receives a document image and outputs through different channels with each other electronic signals of RGB corresponding to the document image of RGB.

The image sensor 11 receives through a predetermined optical system reflection light (from a scanning target object such as a document) of light sequentially emitted from the plural light sources 12R, 12G and 12B, and thereby scans an image of the scanning target object. The image sensor 11 outputs an electric signal corresponding to received light amounts on plural pixels in each line. The light sources 12R, 12G and 12B are LEDs and are plural light sources that emit light of plural colors (here, three primary colors RGB).

The signal processing unit 2 includes an analog front end (AFE) 21, a channel composition circuit 22, a peak detection unit 23, an image processing unit 24, a timing signal generating circuit 25, a driving circuit 26, and a processor 27.

The analog front end (AFE) 21 is a circuit that performs sample-hold, AGC (automatic gain control), and A/D (Analog to Digital) conversion. The AFE 21 samples and holds an output signal of the image sensor 11 at a timing specified with a sampling clock.

The channel composition circuit 22 changes an order of output data of the AFE 21 and thereby outputs image data as RGB data in an order along a scanning direction.

The peak detection unit 23 detects a largest value and a smallest value of pixel values in each line for each color of RGB.

The image processing unit 24 performs a predetermined image process for the image data after shading correction, if required.

The timing signal generating circuit 25 generates a driving signal for the driving circuit 11a, a driving signal for the driving circuit 26, and the like.

Figure 2:
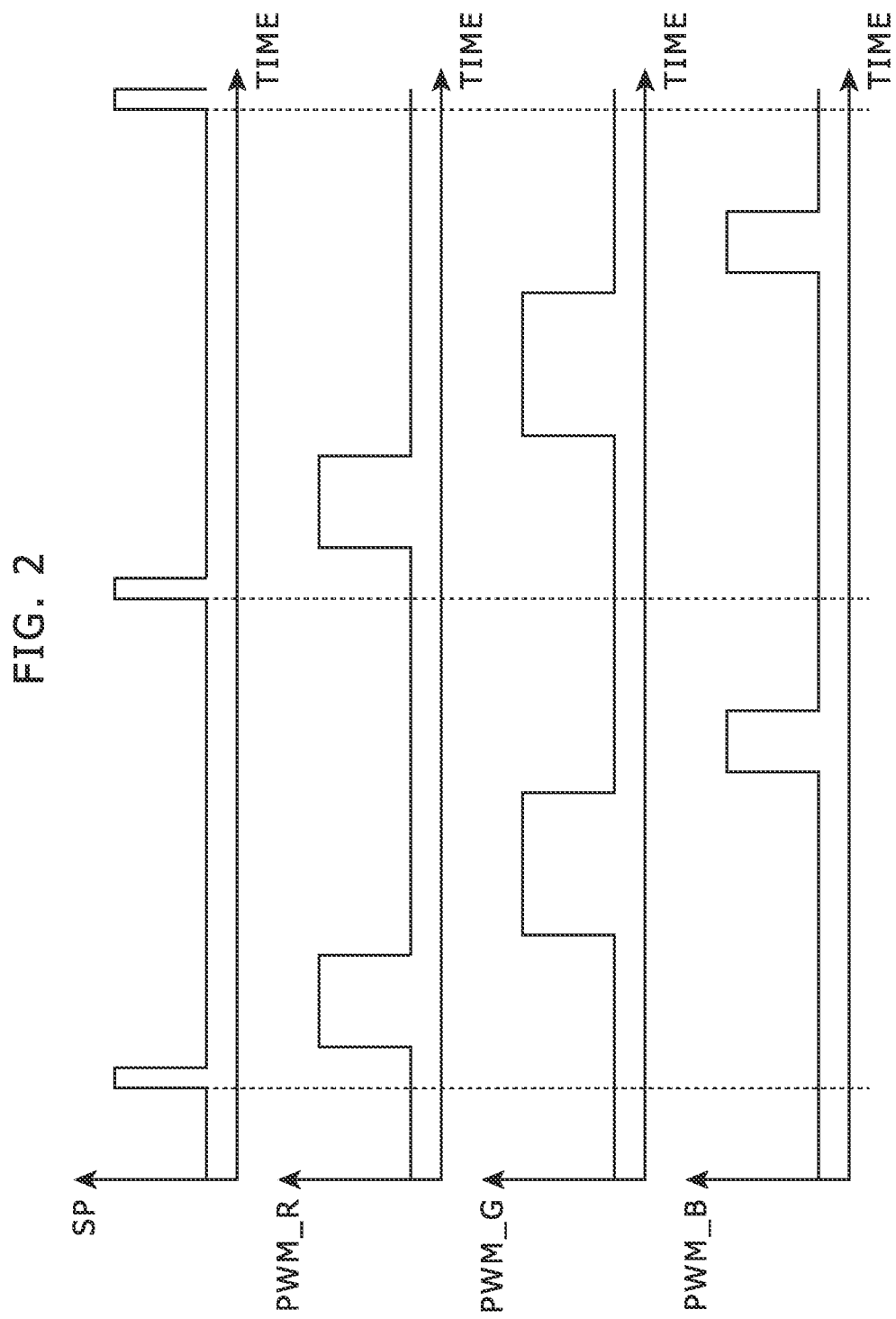
FIG. 2 shows a diagram that explains a pulse width instruction signal in monochrome scanning.

FIG. 2 shows a diagram that explains a pulse width instruction signal in monochrome scanning.

As shown in FIG. 2 for example, the driving circuit 26 drives the light sources 12R, 12G, and 12B with pulse width modulation signals PWM_R, PWM_G, and PWM_B (i.e. pulse signals for pulse widths) for the respective colors such that the pulse width modulation signals are delayed sequentially with a predetermined delay amount in synchronization with the start pulse signal SP, and conducts driving currents through the light sources 12R, 12G, and 12B, and thereby causes the light sources 12R, 12G, and 12B to sequentially emit light.

The processor 27 includes a CPU (Central Processing Unit), a ROM (Read Only Memory), a RAM (Random Access Memory) and the like, loads a program from the ROM or an unshown storage device to the RAM, and executes the program using the CPU and thereby acts as sorts of processing units. Here, the processor 27 acts as a controller 27a.

The controller 27a supplies an instruction of a light-emitting pulse width for the light sources 12R, 12G and 12B to the driving circuit 26. In this embodiment, the controller 27a supplies an instruction of the light-emitting pulse width (i.e. the pulse width modulation signal) to the driving circuit 26 using the timing signal generating circuit 25.

Further, the controller 27a performs light amount adjustment (here, adjustment of the light-emitting pulse width) for color scanning on the basis of the largest value and the smallest value of each color of RGB detected by the peak detection unit 23.

Figure 3:
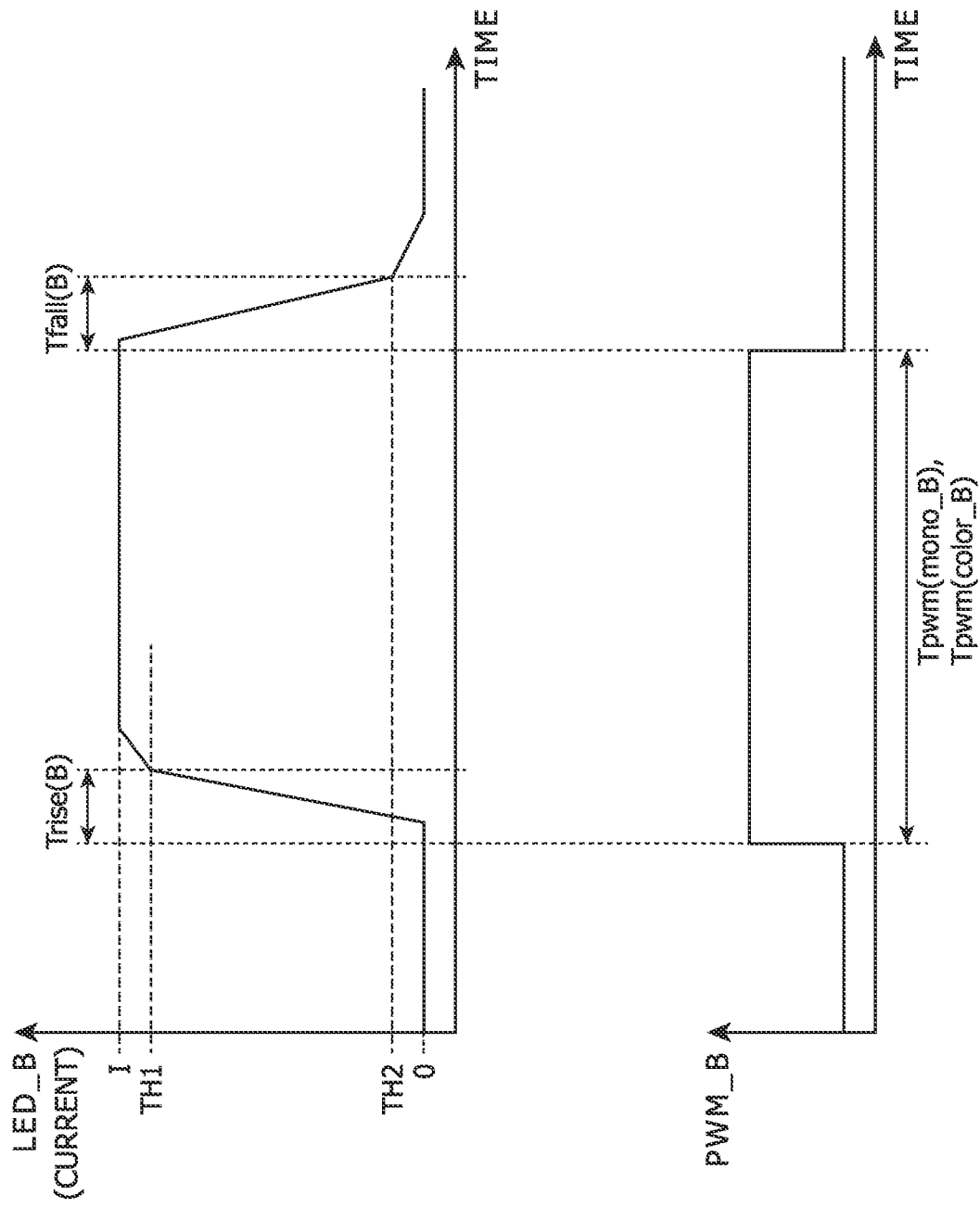
FIG. 3 shows a diagram that explains a rising time and a falling time of a driving current.

FIG. 3 shows a diagram that explains a rising time and a falling time of a driving current. FIG. 3 explains waveforms of the pulse width modulation signal (driving signal) PWM_B for the light source 12B and the driving current LED_B of light source 12B for the color Blue (B). Waveforms of other colors than Blue, i.e. Red and Green are likewise.

For example, as shown in FIG. 3, due to a characteristic of the driving circuit 26 and/or the like, a delay occurs on rising of the driving current LED_B corresponding to rising of the pulse width modulation signal (driving signal) PWM_B, and the rising of the driving current LED_B gets gentle. Here, a time taken until the driving current LED_B rises to a predetermined threshold value TH1 is considered as a rising time Trise(B), and a time taken until the driving current LED_B falls to a predetermined threshold value TH2 is considered as a falling time Tfall(B); and the rising time Trise(B) and the falling time Tfall(B) have been determined through an experiment or the like. It should be noted that such rising time and such falling time may be set intentionally for restraining crosstalk.

Further, for monochrome scanning, the controller 27a corrects a light-emitting pulse width of each color among the plural colors on the basis of a rising time and a falling time of a driving current conducted through the light source 12R, 12G, or 12B by the driving circuit so as to cause the light-emitting pulse width to agree with a light-emitting pulse width based on a predetermined color balance ratio of the color. The color balance ratio for monochrome scanning is different from that for color scanning.

Specifically, the controller 27a derives light-emitting pulse widths Tpwm(mono_R), Tpwm(mono_G) and Tpwm(mono_B) of respective colors of RGB for monochrome scanning in accordance with the following formulas for example, from (a) light-emitting pulse widths Tpwm(color_R), Tpwm(color_G) and Tpwm(color_B) for color scanning set in the aforementioned light amount adjustment, (b) a total value of the light-emitting pulse widths of all of the plural colors for monochrome scanning, (c) the color balance ratios CB(mono_R), CB(mono_G) and CB(mono_B), (d) the rising times Trise(R), Trise(G) and Trise(B), (e) the falling times Tfall(R), Tfall(G) and Tfall(B), and the like.

$$Tpwm(mono\_R)=(Tpwm(color\_R)-Trise(R)+Tfall(R))\,Rate(R)+Trise(R)-Tfall(R)$$

$$Tpwm(mono\_G)=(Tpwm(color\_G)-Trise(G)+Tfall(G))*Rate(G)+Trise(G)-Tfall(G)$$

$$Tpwm(mono\_B)=(Tpwm(color\_B)-Trise(B)+Tfall(B))*Rate(B)+Trise(B)-Tfall(B)$$

Here, Rate(R), Rate(G) and Rate(B) are conversion ratios from the light-emitting pulse widths for color scanning to the light-emitting pulse widths for monochrome scanning, and are derived on the basis of the total value of the light-emitting pulse widths for monochrome scanning (fixed value), the light-emitting pulse widths for color scanning, and the color balance ratios in accordance with the following formulas.

$$Rate(R)=(Tpwm(mono\_R)+Tpwm(mono\_G)+Tpwm(mono\_B))/Tpwm(color\_R)*CB(mono\_R)$$

$$Rate(G)=(Tpwm(mono\_R)+Tpwm(mono\_G)+Tpwm(mono\_B))/Tpwm(color\_G)*CB(mono\_G)$$

$$Rate(B)=(Tpwm(mono\_R)+Tpwm(mono\_G)+Tpwm(mono\_B))/Tpwm(color\_B)*CB(mono\_B)$$

The following part explains a behavior of the aforementioned image processing apparatus.

Firstly, the controller 27a performs light amount adjustment for color scanning, and sets the light-emitting pulse widths for color scanning Tpwm(color_R), Tpwm(color_G) and Tpwm(color_B).

Subsequently, using the color balance ratios CB(mono_R), CB(mono_G) and CB(mono_B) for monochrome scanning, the total value of the light-emitting pulse widths for monochrome scanning, the rising times Trise(R), Trise(G) and Trise(B) and the falling times Tfall(R), Tfall(G) and Tfall(B), specified in advance, the controller 27a performs light amount adjustment for monochrome scanning, and derives and sets the light-emitting pulse widths Tpwm(mono_R), Tpwm(mono_G) and Tpwm(mono_B) for monochrome scanning, individually from the light-emitting pulse widths Tpwm(color_R), Tpwm(color_G) and Tpwm(color_B) for color scanning.

Subsequently, in color scanning, the controller 27a causes the light sources 12R, 12G and 12B to emit light with the light-emitting pulse widths Tpwm(color_R), Tpwm(color_G) and Tpwm(color_B) using the timing signal generating circuit 25 and the driving circuit 26, and thereby performs scanning of a color image.

Contrarily, in monochrome scanning, the controller 27a causes the light sources 12R, 12G and 12B to emit light with the light-emitting pulse widths Tpwm(mono_R), Tpwm(mono_G) and Tpwm(mono_B) using the timing signal generating circuit 25 and the driving circuit 26, and thereby performs scanning of a monochrome image.

As mentioned, in the aforementioned embodiment, the driving circuit 26 drives the light sources 12R, 12G and 12B, and the light sources 12R, 12G and 12B emits light of plural colors. The image sensor 11 scans an image on the basis of the light sequentially emitted by the plural light sources 12R, 12G and 12B. The controller 27a supplies an instruction of a light-emitting pulse width for the light sources 12R, 12G and 12B to the driving circuit 26. Further, for monochrome scanning, the controller 27a corrects a light-emitting pulse width of each color among the plural colors on the basis of a rising time and a falling time of a driving current conducted through the light source 12R, 12G, or 12B by the driving circuit so as to cause the light-emitting pulse width to agree with a light-emitting pulse width based on a predetermined color balance ratio of the color.

Consequently, the light-emitting pulse widths are set in consideration of rising times and falling times of the driving currents, and therefore, in monochrome scanning, even if a color among RGB has a very low color balance (e.g. Blue in a case that CB(mono_R)=3/10, CB(mono_G)=6/10, CB(mono_B)=1/10), the light source of such color does not become off and monochrome scanning is performed using light with proper color balance ratios.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned embodiment, the controller 27a may advance a starting time point of a light-emitting pulse in light amount adjustment for color scanning, by the aforementioned rising time Trise(R), Trise(G) or Trise(B). In such a case, the received light amount is gained.

What is claimed is:

1. An image scanning apparatus, comprising:
   plural light sources configured to emit light of plural colors;
   an image sensor configured to scan an image on the basis of the light sequentially emitted by the plural light sources;
   a driving circuit configured to drive the plural light sources; and
   a controller configured to supply to the driving circuit an instruction of light-emitting pulse widths of the light sources;
   wherein the controller corrects the light-emitting pulse widths in monochrome scanning on the basis of a rising time and a falling time of driving currents conducted through the light sources by the driving circuit so as to cause the light-emitting pulse widths to agree with light-emitting pulse widths based on predetermined color balance ratios of the plural colors, respectively.

2. The image scanning apparatus according to claim 1, wherein the controller advances by the rising time a starting time point of a light-emitting pulse in light amount adjustment for color scanning.

3. The image scanning apparatus according to claim 1, wherein the controller derives the light-emitting pulse widths in monochrome scanning on the basis of (a) light-emitting pulse widths in color scanning, (b) a total value of the light-emitting pulse widths of all of the plural colors in monochrome scanning, (c) the color balance ratios, (d) the rising time, and (e) the falling time.

* * * * *